United States Patent [19]
Dobry

[11] Patent Number: 5,314,005
[45] Date of Patent: May 24, 1994

[54] PARTICULATE HEATING/COOLING AGENTS

[76] Inventor: Reuven Dobry, 87 Rolling Wood Dr., Stamford, Conn. 06905

[21] Appl. No.: 797,403

[22] Filed: Nov. 25, 1991

[51] Int. Cl.⁵ .............................................. F23D 20/00
[52] U.S. Cl. ...................................... 165/10; 165/46; 62/530; 219/772; 609/114
[58] Field of Search ................ 165/104.13, 10, 104.17, 165/46; 62/530; 128/403; 219/10.65

[56] References Cited

U.S. PATENT DOCUMENTS

| | | | |
|---|---|---|---|
| 3,596,713 | 8/1971 | Katz | 165/104.13 |
| 3,780,537 | 12/1973 | Spencer | 62/530 |
| 3,874,504 | 4/1975 | Verakas | 206/219 |
| 3,885,403 | 5/1975 | Spencer | 62/530 |
| 4,104,883 | 8/1978 | Naef | 165/104.13 |
| 4,221,259 | 9/1980 | Rone et al. | 165/1 |
| 4,462,224 | 7/1984 | Dunshee et al. | 62/530 |
| 4,530,220 | 7/1985 | Nambu | 62/530 |
| 4,712,606 | 12/1987 | Menelly | 165/1 |
| 4,910,978 | 5/1990 | Gordon et al. | 62/530 |
| 4,937,412 | 6/1990 | Dobry | 219/10.55 M |
| 5,031,418 | 7/1991 | Hirayama et al. | 62/530 |
| 5,179,944 | 1/1993 | McSymytz | 62/530 |
| 5,190,033 | 3/1993 | Johnson | 128/403 |

*Primary Examiner*—Albert W. Davis, Jr.
*Attorney, Agent, or Firm*—Needle & Rosenberg

[57] ABSTRACT

This invention discloses novel compositions of matter, in particulate forms, which function as heat transfer agents for heating or cooling applications. The particulates comprise solid carriers containing microwave responsive substances which are liquid at a predetermined elevated operating temperature. These particulate agents, preheated by microwave energy, serve as sources of dry heat or moist heat, depending on their composition. They also serve as sources of cold, when prechilled in a freezer.

4 Claims, 1 Drawing Sheet

PARTICULATE HEATING/COOLING AGENTS

BACKGROUND OF THE INVENTION

1. Technical Field

This invention concerns materials which can serve as intermediate agents for transfer of heat from an energy source to a load object. More specifically, it relates to particulate compositions of matter which can be used effectively for heating or cooling applications.

In a typical heating application, agent B receives heat from source A and delivers its heat to load object C. The same applies, in principle, to a cooling application. In that case, agent B receives cold (gives up its heat to) source A and gives up its cold (receives heat from) load object C. Putting it in another way, one may consider the load object of cold as a source of heat and the source of cold as the load object of heat. Thus, intermediate agents play a similar role in heating and cooling.

2. Description of the Prior Art

Examples of common heating and cooling applications come to mind quite readily. Electric corn poppers or hairdryers use air as the intermediate heating agent. Pressing irons or frying pans use metal as the intermediate heating agents. Hot oil is used as an intermediate heating agent in deep frying and water is used as the primary intermediate heating agent in most cooking applications. Turning to a common example of cooling, air is the primary cooling intermediate in a refrigerator. All of the above are instances of dynamic, steady-state heat transfer, where the intermediate agents receive and discharge heat concurrently, either intermittently or continuously. Under these conditions, the agents' ability to transfer heat is of primary importance.

In other situations, the process of heat transfer is sequential rather than concurrent. In such cases, an intermediate heating (cooling) agent receives heat (cold) from a source, stores the heat (cold) for later use and then delivers it to a load object, likely at another location away from the original source. Sequential heating is exemplified by preheated water in a jacketed baby feeding dish or in a hot water bottle. A freezer pack is an example of stored cold. It is clear that in sequential heating/cooling applications the intermediate agents' ability to store heat is an important attribute. Measures of capacity to store heat for materials which do not undergo a change of state relate to specific heat per unit weight and, in combination with density, specific heat per unit volume. Changes of state will be considered later.

One other attribute worthy of mention is fluidity; i.e. the agents' ability to flow readily and surround the load object, thereby delivering heat to more than one surface. It can, and often does, play an important role in concurrent as well as sequential schemes of heat transfer, as will become more evident in the discussion which follows.

Against this background, one can assess the ability of various materials, in their respective physical states, to act as intermediate heat transfer agents.

Gases

Air and combustion gases are readily available, and their fluidity is clearly an advantage. They are well-suited for heating applications, but relatively slow and energy wasteful, unless the rate of heat transfer to load objects is enhanced by convection. The low specific heat and low density of gases rule them out as agents for storage of heat, except where massive volumes of gas can effectively be employed. The same generally applies to cooling.

Solids

Metals are effective agents for transfer of heat by virtue of their high conductivity. However, low specific heat (approx. 0.1 cal/g °c) and high density make them relatively poor agents for storage of heat, except when substantial mass can be brought into play. Inorganic, mineral-type solids are poor thermal conductors, largely unsuitable for heat transfer. Their moderate specific heat (0.2–0.3 cal/g °c) is not sufficient for storage of heat or cold. Moreover, lacking fluidity, their mode of heat transfer is characteristically undirectional and most effective via immediate contact.

Liquids

Because of their physical attributes, liquids are uniquely suited for most heating and cooling applications. They possess fluidity and ability to transmit heat by conduction as well as convection. Moreover, their medium density (0.8–1.2 g/cc) and high specific heat (0.5–1.0 cal/g °c) make them ideal for storage of heat in sequential processes. A common liquid such as water can also exist in other states, thereby extending its effective range of operating temperatures. Water can exist as steam for heating applications, with the full benefit of fluidity. It also can exist as ice for cooling applications, albeit at the expense of fluidity. Changes of state enhance the ability of water to store and carry heat by virtue of the latent heat of condensing steam (for heating) and melting ice (for cooling), over and above what is available via sensible heat solely in the liquid state.

Focusing our attention on sequential heating scenarios; i.e. those involving transfer of stored heat from a source to a load object, liquids would clearly seem to be the preferred choice. Gases are simply not worthy of practical consideration for reasons already enumerated, based on their physical properties. Solids might similarly be by-passed from consideration due to their lack of fluidity and limited heat-storage capacity. Non-metallic solids are also as slow and difficult to preheat or precool for subsequent use, as they are slow to give up their heat or cold. However, it seemed that the role of solids deserved further consideration in the light of opportunities presented by new developments in materials and technology.

It should be noted that liquids are not the panacea for all heating/cooling applications. Many common liquids, water included, cannot serve as permanent and reusable intermediate agents, because they are volatile, subject to loss by evaporation and therefore in need of frequent replacement. Volatile liquids risk pressure build-up in hermetically sealed containers. Non-volatile liquids are, of course, safer. However, volatile or not, liquids must be effectively contained, secure against leakage as a result of physical or thermal damage to materials which contain them. Moreover, liquids (at a density of 1.0 g/cc, or higher) may be too heavy for some applications.

In the field of health-care, for instance, where the load object is animate, there are many portable hot or cold compresses to choose from. Several compresses contain liquids or gels which must be preheated or precooled before use, as described in U.S. Pat. Nos. 3,885,403 and 3,780,537. Others derive their thermal effects from physical phenomena such as solution or crystallization, as cited in U.S. Pat. Nos. 3,874,504 and 4,462,224. With the advent of microwave technology, several of the newer compresses are claimed to be preheatable in any microwave oven. They apparently contain gelled or relatively volatile aqueous liquids which can be damaged to the point of leakage or otherwise rendered ineffective by repeated use or excessive preheating. Therefore, they require elaborate precautions and occasional reconditioning. Heating/cooling pads often present surface temperature extremes which upon direct contact with the skin may cause "burns", hot or cold. Hence, they must be shielded by extra insulation before use. With all that considered, it is clear that heating/cooling pads and other devices could benefit from a wider choice of materials which are safer and simpler to use.

Particulate heat transfer materials are disclosed in the prior art. A liquid-solid heat transfer system described by Katz in U.S. Pat. No. 3,596,713 utilizes a plurality of particles disposed within a transport fluid. Each particle contains a high heat of fusion material or high heat of vaporization material bound within an impermeable housing. Latent heat storage is effectuated by changes of phase within the particles, while the fluid remains at a substantially fixed temperature. A similar scheme is described by Naef in U.S. Pat. No. 4,104,883 for use in ocean thermal energy exchange plants. The present invention differs from the above prior art in many respects, as follows:

1. It employs aggregates or beds of particulate solids only; i.e. without any suspending fluid or fluidized transport.
2. Heat absorbing substances are retained in permeable rather than impermeable housings; i.e. by capillary action rather than hermetically sealed containment.
3. Thermal effects are derived primarily from sensible heat rather than latent heat, changes in phase being incidental as temperatures vary over wide ranges.
4. Dry or moist heat, as well as cold, are delivered directly to load objects, rather than via heat exchange equipment.
5. Thermal delivery is characterized by changing temperature rather than constant temperature, and by temperature gradients within the aggregates of particulate matter which provide the benefit of gradual and sustained heating or cooling.

The idea of using particulate matter for heating or cooling applications was proposed in my previous U.S. Pat. No. 4,937,412. Further development of this concept, since that patent issued, have uncovered novel combinations of materials with useful and unique properties. Accordingly, the object of this invention is to provide novel compositions of particulate matter which can serve as intermediate agents for storage and transport of heat or cold with some of the benefits of liquids but without the shortcomings of liquids or other existing materials. A further object of the invention is to make such materials versatile enough in physical property and function to make them suitable for a wide variety of applications.

SUMMARY OF THE INVENTION

The present invention identifies particulate compositions of matter which can serve as intermediate agents for storage and transport of heat or cold from a source to a load object. Porous or hollow absorbent particles are, respectively, impregnated or filled preferably with microwave responsive liquids which include relatively non-volatile components. The loaded particles retain the liquids, effectively, by capillary action and physical containment. The non-volatile component of the liquid make the resulting compositions permanent and reusable intermediate carriers of stored heat, following preheating by microwave energy, or cold, following prechilling in a freezer.

BRIEF DESCRIPTION OF THE DRAWINGS

The present invention is illustrated in the accompanying drawings of which.

DESCRIPTION OF THE PREFERRED EMBODIMENTS

As indicated previously, mineral-based solids are normally not considered to be good agents for storage and transport of heat. In summary, they possess low specific heat and medium density which restrict their capacity to store heat or cold. Their lack of fluidity also limits their ability to transmit heat or cold to a load object. Fluidized beds are special situations where solids in particulate forms, with the added benefit of fluidity, act as intermediate agents of heat transfer between a fluidizing gas and a load object.

Solid matter in particulate forms exhibits the same particle density but lower bulk density than a coherent solid, due to the interstitial voids between particles. If the particles are made porous or hollow with the same base material, that further reduces their bulk density. The net result is that an aggregate of such solids exhibits even lower specific heat per unit volume, and diminished ability to accept and transport heat; i.e. they are, in effect, thermal insulators.

While the above scenario seems to be most unfavorable for any likely heat transfer agent, it does present unusual and hitherto unrecognized opportunities for creating new combinations of materials with unique properties. Let us consider what happens when porous or hollow solids are impregnated with liquids. Their density, both particle and bulk density, increases. Their specific heat, per unit of weight and unit volume, also increases by virtue of the contained liquids, since the latter are higher in specific heat than the solids. Let us further stipulate that the liquids in question are in fact microwave responsive liquids which include relatively non-volatile components. The particles retain the liquids by capillary action or physical containment, and their lack of volatility makes the resulting compositions microwave preheatable and also reusable sources of heat. Let us further assume that one such non-volatile component is not only hydrophilic but in fact hygroscopic. In addition, let it contain some dissolved water, typically and preferably at a concentration which is at equilibrium with ambient humidity. The presence of water further increases the specific heat of such a combination of materials. It also provides it with the capability to supply moisture when heated and to replenish moisture from ambient atmospheric sources when not in use.

Figure 1:
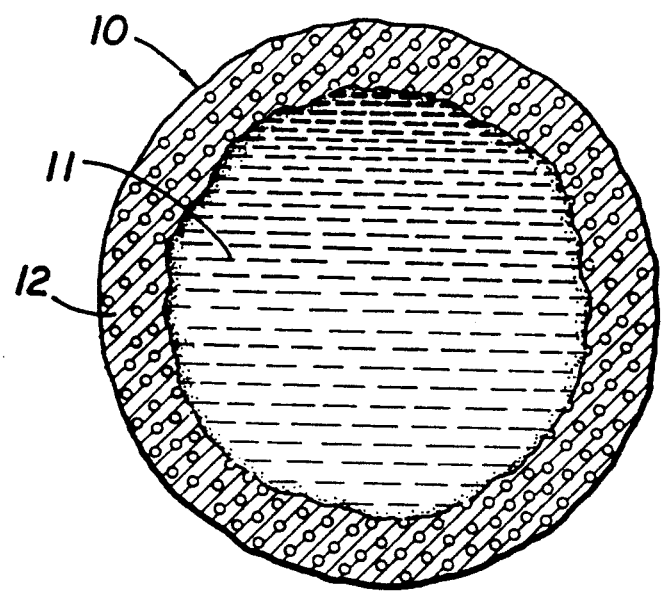
FIG. 1 is a sectional view of a uniformly porous particle containing absorbed liquid.
Figure 2:
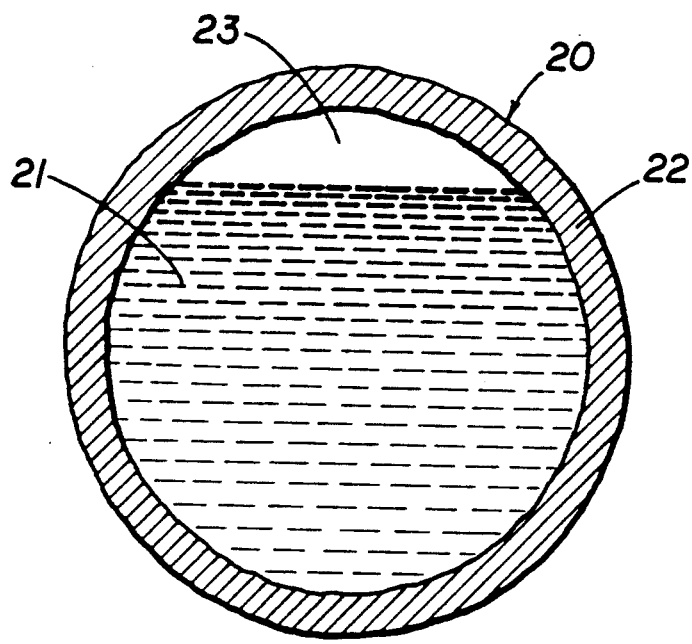
FIG. 2 is a sectional view of a capsule, with a well defined wall and hollow interior, containing encapsulated liquid.

Turning now to the drawings, FIG. 1 shows an absorbent particle 10 with uniform or continuous porosity. The particle holds some absorbed liquid 11 by capillary action. It also shows some extra absorption capacity which is depicted illustratively as a liquid deficient outer shell 12. FIG. 2 shows a particle with variable porosity in the form of a capsule 20, wherein a liquid substance 21 is contained within permeable walls 22. The capsule also shows an unfilled headspace 23. The extent of fill in each particle or capsule can change with the relative thermal expansion of host solid and contained liquid, as the temperature changes. It can also vary with the loss or recovery of moisture under conditions of use.

The particulate compositions of this invention thus consist of solid components which act as carriers for contained liquids. The resulting compositions possess physical properties which are intermediate between those of pure solid and pure liquid, but without the afore-mentioned drawbacks of liquids. With the added benefit of fluidity, aggregates of particulate solids are therefore more suitable intermediate agents for heating-/cooling applications.

The solid component of the particulate matter may be any inert, thermally stable and, preferably, non-toxic material. It needs to be inert toward the liquid it contains and, in the interest of safety, thermally stable and non-toxic. Other properties of the solid depend on the mechanism which will retain the liquid components. For liquid absorption, the solid needs to be porous and highly absorbent, able to receive and retain the liquid by capillary action. Examples of such materials include activated alumina, activated silica, molecular sieves and the like. For liquid encapsulation, the solid must also be suitable for making capsules, with the liquid retained inside physically. Any number of such materials, natural and man-made, are available for that purpose and known to those skilled in the art of encapsulation. The exact nature and specific choice of "wall" materials will depend on the liquid they are intended to contain and conditions under which they are to be used. The size and shape of the particulate matter thus made should be small enough to present sufficient surface and points of contact for heat transfer but not so small as to be dusty and difficult to handle. It should also be smooth-surfaced to minimize abrasion and promote fluidity. Preferred sizes are in the range of 1/32" to ⅛" or approximately 20 mesh to 6 mesh in the U.S. Sieve Series.

The microwave responsive liquids which are used in this invention should possess low volatility; i.e. negligible vapor pressure at 25° C. and boiling points, at normal barometric pressure, well above 150° C. They should also be stable at least up to the maximum temperature in which they are to be used. Among materials which meet such requirements, but not excluding others, are: ethylene glycol and its polymers, propylene glycol and its polymers, glycerol and its polymers and the like. Microwave susceptibility is also exhibited by chemical derivatives of such compounds. Among them are: esters of acetic acid and longer chain aliphatic acids, and side chains derived from alcohols or polyethers.

Microwave responsive liquids vary greatly in their physical properties, depending on their chemistry. Liquids rich in hydroxyl or ether groups exhibit high microwave susceptibility, complete water miscibility and extreme hygroscopicity. Compounds in this category (hydrophiles), such as glycerol and polyethylene glycols, are clearly preferred for delivery of moist heat. Other compounds, those high in molecular weight and more complex in structure, are less microwave susceptible, virtually water immiscible and in fact moisture repellent. Compounds in this category (hydrophobes), such as monoglycerides and acetylated monoglycerides, are preferred for delivery of dry heat. Properties such as specific heat, specific gravity, viscosity and chemical stability also need to be considered and, occasionally, traded off. That provides the practitioner with substantial latitude in selecting microwave responsive liquids, either individually or in compatible mixtures, to suit any specific application. It is clear that for cold application alone, the liquids contained in the carrier solids need not be microwave responsive. They may be any liquids which, prechilled, can serve as a source of cold.

The preferred materials of this invention are non-toxic, and many are in fact food grade materials. They do not pose any hazard in case of accidental misuse or even ingestion. As a general rule, it is advisable to restrict the amount of liquid relative to the host solid, so that differences in thermal expansion between the materials do not result in the expulsion of liquid out of the solid with changes in temperature. It should also be noted that liquid components of the particulates need not necessarily be liquid at room temperature; i.e. at 25° C., for the purpose of this invention. They may be solid semisolid or even supercooled liquids at room temperature, but meltable at some elevated temperature for their proper disposition and usage as liquid susceptors. Latent heat inherent in changes of phase may in fact be of benefit in some applications.

Operating temperatures of the particulate matter of this invention may be as low as 0° F. ($-18°$ C.); i.e. typical household freezer, which may be used for prechilling an aggregate of particulate matter for a cold application. For heating purposes, aggregates of particulate matter may be preheated up to practical limits of volatility and/or stability of the components in question. Clearly, heat application to animate objects requires, for the sake of safety, lower temperature than what is tolerable for inanimate application. In either case, the temperature in the core of a particulate aggregate, loosely packed, may be substantially higher than at its outer boundary. Temperature gradients, core to surface, are inherent in the process of heat propagation through beds of particulate solids. That may be an advantage in heating applications for animate objects. As the bed cools down, it may in fact be possible to bring more heat to the outer boundary by mixing the contents of the bed. The upper reaches of operating temperature are established as a matter of dynamic balance between heat generated, heat stored and heat either given up to a load object or lost to the surroundings. Similar considerations applies to cold applications.

As stated previously, the type of heat delivered to a load object depends on the liquid which is contained in the particulate matter. Moist heat can best be delivered by hygroscopic liquids which are contained in porous solids or vapor permeable capsules. Moisture given up can later be restored by exposing the solid to ambient humidity. Dry heat may be delivered by solids containing liquids which are free of moisture; i.e. hydrophobic liquids, or hydrophilic liquids which are kept away from moisture in a moisture-free environment. The above options merely illustrate how similar results may be achieved by various combinations of materials and by the physical conditions of the particulate agent and its environment.

The particulate compositions of this invention are uniquely situated for healthcare applications. Heating/cooling pads comprising particulate matter in fabric bags, for example, have the following advantages:

a. Ability to deliver dry heat or moist heat, by specific choices of liquid components.
b. Automatic recovery of moist heat capability from ambient air; i.e. without need for deliberate external resupply of water to replenish moisture given up.
c. Relative lightweight compared to liquids, gels and most non-porous solids.
d. Fast preheat (reheat) by microwave energy rather than conventional methods.
e. Repeated usage with minimal handling and preparation.
f. Dual functionality in one product; heat or cold.
g. Benefits from desirable properties of liquids; e.g. higher specific heat, without risk of leakage or drippy mess.
h. Good draping properties; never freezable to a solid mass.
i. Safer, gradual delivery of heat or cold, by the nature of heat transfer through static beds of solids.

Primary consideration has thus far been given to applications of sequential heating; i.e. those entailing heat generation in the microwave and later delivery of stored heat to a load object outside the microwave. However, with the property of fluidity, particulate solids of this invention may be used as sources of heat inside the microwave. Any object which is inherently microwave transparent can be immersed in a bed of such solids and be heated by them while the combination is undergoing microwaving. This and other aspects of the invention will become more evident from the examples which follow.

EXAMPLE 1

This is an example of a moist heating pad. A bag made of polyester felt, measuring about 10" by 4" inside, was filled with 1½ lbs. of particulate matter, in 4 equal stitched compartments 2½×4" each. The particulate matter consisted of beads of activated alumina 1/16" in diameter impregnated with a mixture of glycerol and water, the overall composition comprising 59% alumina, 29% glycerol and 12% water. Following microwaving for 3 minutes at 700 watts, the pad emitted perceptible moist heat, with a surface temperature 105° F. or greater, for 25-30 minutes.

EXAMPLE 2

This is an example of a cooling pad. Another pad, similarly sized and filled with the particulate composition of Example 1 was fabricated as a stitched bag with one surface made of polyester felt and the other surface made of a thin polyester fabric. Following storage in the freezer at 0° F. for 6 hours, the pad was applied to the inventor's body, with the thin polyester fabric directly on the skin. Skin temperature, measured by thermocouple, dropped from 85° F. to 56° F. in 5 minutes. It dropped to 52° F. in another 5 minutes and then remained at that temperature for the next 20 minutes.

EXAMPLE 3

This example demonstrates recovery of lost moisture. A facial compress was made of fabric similar to Example 1 and filled with 12 ounces of the same particulate composition. The compress was preheated at 700 watts for one minute and used by the inventor for a moist-heat facial treatment for 20 minutes. A measurable drop in weight was noted after the single usage which was attributed to loss of moisture. The used compress was stored in the open, at a relative humidity of about 65%. About 75% of the lost weight was thus restored in 24 hours and 90% in 48 hours.

EXAMPLE 4

This is an example of dry therapeutic heat treatment. Several pounds of activated alumina 1/16" in diameter were impregnated with 65% by weight of an acetylated monoglyceride. The overall composition of the particles was 60% activated alumina and 40% acetylated monoglyceride. The particles were placed into a glass bowl and microwaved at 700 watts for 4 minutes. Upon removal of the bowl from the microwave the inventor immersed his bare hands into the particulate bed exercising and working through the particles. Dry comforting heat was thus supplied to the muscles and joints for at least 15-20 minutes. Prolonged treatment was possible at higher bed temperatures with the use of cotton gloves.

EXAMPLE 5

This example illustrates heating concurrent with microwaving. The particulates of Example 4 were returned to the microwave with a workpiece of polypropylene material immersed in the bed. This thermoplastic material is not microwave responsive per se. Upon microwaving at 700 watts, in several steps of 4 minutes each, the bed became much too hot to touch. With the help of thermal gloves, it was determined that the workpiece was soft and pliable; i.e. hot enough for reshaping. The workpiece was then reshaped, removed from the particulate bed and water-quenched, with its new shape retained.

EXAMPLE 6

This example illustrates the use of encapsulated liquid from a commercially available source. About 500 softgels (gelatin capsules, ⅜" in diameter) containing cod liver oil, were filled into a 4-compartmented bag made of thin polyester fabric. The bag was then stored in the freezer overnight, where the oil in the capsules was observed to have solidified. Upon removal from the freezer, the bag was applied directly onto the skin of the inventor, with a towel superimposed and serving as outer insulation. The bag provided moderately intense cold for about 15-20 minutes, with occasional flipover of the bag or mixing of its contents. Based on experience with other particulate compositions, it is predictable that smaller capsules filled with other materials would prolong the cold treatment.

The foregoing description is for the purpose of teaching the person of ordinary skill in the art how to practice the present invention. It is not intended to detail all of those obvious variations and alternatives which will become apparent to the skilled practitioner upon reading the description. It is intended, however, that all such variations and alternatives be included within the scope of the present invention which is defined by the following claims.

I claim:
1. Particulate heating/cooling agents comprising:
   (a) a solid carrier material which is porous, liquid absorbent and centrally hollow; and

(b) a substance disposed in said carrier material which is liquid at a predetermined elevated operating temperature and which is retained in the carrier material by physical containment and capillary forces, said substance including a relatively non-volatile component.

2. The particulate heating/cooling agents of claim 1, wherein said agents comprise particles ranging in size from U.S. Sieve No. 20 to U.S. Sieve No. 6, or approximately 1/32" to ⅛" in diameter.

3. Particulate heating/cooling agents comprising:
   (a) a solid carrier material which is porous, liquid absorbent and which consists of a mixture of uniformly porous and centrally hollow, porous particles; and
   (b) a substance disposed in said carrier material which is liquid at a predetermined elevated operating temperature and which is retained in the carrier material by a combination of physical containment and capillary forces, said substance including a relatively non-volatile component.

4. The particulate heating/cooling agents of claim 3, wherein said agents comprise particles ranging in size from U.S. Sieve No. 20 to U.S. Sieve No. 6, or approximately 1/32" to ⅛" in diameter.

* * * * *